US006781813B1

(12) United States Patent
Bornheim et al.

(10) Patent No.: US 6,781,813 B1
(45) Date of Patent: Aug. 24, 2004

(54) RELEASE ELEMENT FOR INITIATING PYROTECHNICS

(75) Inventors: Wilhelm Bornheim, Troisdorf (DE); Jan Petzold, Rosrath (DE); Heinz Schäfer, Lilienthal (DE); Ulrich Steiner, Troisdorf (DE); Jürgen Zimmermann, Troisdorf (DE)

(73) Assignee: Orica Explosives Technology Pty. Limited, Melbourne (AU)

( * ) Notice: Subject to any disclaimer, the term of this patent is extended or adjusted under 35 U.S.C. 154(b) by 98 days.

(21) Appl. No.: 10/018,921
(22) PCT Filed: Jun. 20, 2000
(86) PCT No.: PCT/EP00/05657
    § 371 (c)(1),
    (2), (4) Date: Apr. 12, 2002
(87) PCT Pub. No.: WO01/02796
    PCT Pub. Date: Jan. 11, 2001

(30) Foreign Application Priority Data

Jul. 6, 1999 (DE) .......................................... 199 30 904

(51) Int. Cl.[7] ................................................ F23Q 3/00
(52) U.S. Cl. ........................ 361/247; 361/115; 361/248
(58) Field of Search ................................ 361/115, 247, 361/248

(56) References Cited

U.S. PATENT DOCUMENTS 5,520,114 A  * 5/1996 Guimard et al. ............ 102/215

FOREIGN PATENT DOCUMENTS

| DE | 84 32 097 | 7/1986 |
| DE | 39 18 408 | 12/1990 |
| EP | 0 301 848 | 2/1989 |
| EP | 0 616 190 | 9/1994 |

* cited by examiner

Primary Examiner—Stephen W. Jackson
(74) Attorney, Agent, or Firm—Fulbright & Jaworski L.L.P.

(57) ABSTRACT

An electronic releasing device for pyrotechnic igniters has a primary and a secondary charge. The primary charge is ignited by means of a circuit that comprises electronic components and whose essential electronic components are accommodated as an integrated components as an integrated circuit in an IC housing, with the housing being disposed on a printed circuit board. The terminals of the IC housing are provided as connecting points for test instruments for checking the serviceability of the integrated circuit and the igniter function and also serve for connection to external electronic devices for programming the releasing device.

7 Claims, 2 Drawing Sheets

RELEASE ELEMENT FOR INITIATING PYROTECHNICS

FIELD OF THE INVENTION

The invention relates to a releasing device for pyrotechnic elements, such as firing elements, gas generators, belt tighteners, electronic detonators, etc., in accordance with the preamble of the first claim.

BACKGROUND AND SUMMARY OF THE INVENTION

With electronic pyrotechnic systems, in particular with those that are used in the automotive field and as electronic detonators, all the functions, such as overvoltage protection, limiter structures, filtering properties, address allocations, arming codes and setting of the delay times are achieved with the aid of a circuit comprising electronic components. The centrepiece is an integrated circuit in a chip. Due to the small structure, for example of a detonator, the chip is mounted in a space-saving manner on a printed circuit board (PCB) using the so-called CoB (chip on board) technology. The functional reliability of the circuit and its security with respect to faults are the most important quality criteria.

This CoB technology has, however, disadvantages that may result in reliability problem. Because of the relatively sensitive bonding points, damage may occur in the production process as a result of the mechanical stress loads encountered during soldering, welding, punching, joining or shrinking. In the extreme case, these may result in contact open-circuits or unstable contacts.

For this reason, it is already known to accommodate the integrated circuits (crystals) in an IC housing (for example, SOT). An electronic igniter having a chip in such a housing is disclosed, for example, in EP 0 616 190 A1.

An object of the present invention is to make releasing units for pyrotechnic systems still more defect-safe and failure-safe by configuring the electronic circuit and providing test possibilities.

The object is achieved according to the present invention, which relates to an electronic releasing device for pyrotechnic igniters having a primary and a secondary charge. The primary charge is ignited by means of a circuit that comprises electronic components and whose essential electronic components are accommodated as an integrated components as an integrated circuit in an IC housing, with the housing being disposed on a printed circuit board. The terminals of the IC housing are provided as connecting points for test instruments for checking the serviceability of the integrated circuit and the igniter function and also serve for connection to external electronic devices for programming the releasing device with the aid of the characterizing features of the first claim. Advantageous embodiments of the invention are claimed in the subclaims.

With conventional CoB technology, the integrated circuit is designed only for previously specified functions. After the chip has been mounted on the printed circuit board, its terminals are inaccessible as a result of coating with a covering composition. As a result, its functions can no longer be tested. Individual inputs into the integrated circuit are no longer possible. The encapsulation of an integrated circuit in a housing has the advantage that each of its terminals, in particular the test points, are brought out and are thereby accessible. At these terminals, contact points may be provided for testing instruments that enable speeding up of checking of the serviceability of the integrated circuit. The new technology makes it possible to provide a chip that, after its installation, can be loaded via the contact points with the appropriate functions provided for use, in particular the fuse address allocations, the arming code and the setting of the delay times. As a result, individual programming of any igniter is possible with respect to its application purpose.

In addition, a chip encapsulated in an IC housing offers the possibility for the performance data of the integrated circuit to be capable of being tested at the manufacturer's premises and before installation in the releasing unit, even under climatic conditions. In particular, with guarantee demands imposed on the manufacturer of the IC, the verification duty with faults that occur under cold conditions are very problematical since the crystal surfaces become iced up and an error determination is prevented. In temperature chambers, the serviceability of the integrated circuit can be tested both at low and at high temperatures, and with predetermined atmospheric simulations, such as humidity and dryness. Because of the accessible terminals, that is possible for every integrated circuit prior to installation. As a result, the failure rate that had to be accepted with the installation of previously untested integrated circuits using CoB technology is drastically reduced.

In a further embodiment of the invention, the chassis grounds of the integrated circuit are brought out at more than one connection point. This ensures that a large-area and defined chassis potential is always applied even with defective chassis bonds. Floating chassis potential causes faults. The multiple contacting of the chassis therefore advantageously achieves high immunity, in particular towards high-frequency electromagnetic radiation.

Depending on the nature of the integrated circuit, the fuse addresses and/or functional priorities can be stored in a memory (for example, EEPROM) in the integrated circuit. That is advantageous if the releasing unit is programmed only shortly before it is used.

If the releasing unit is to be provided only for a certain use for which a fixed programming is provided, for example for a certain fuse address, it may be advantageous if a preset releasing unit is provided separately for every fuse address. In this case, the respective fuse address may be disposed in the form of an already predetermined conductor track pattern on the printed circuit board. This avoids the conventional, expensive cutting of certain conductor tracks (coding) on a so-called programming field on a printed circuit board manufactured in common for all the ignition time steps. The mechanical or thermal cutting of certain conductor tracks, hitherto necessary, to produce certain fuse addresses can result in malfunctions as a result of insufficient cutting or as a result of short-circuits.

The corresponding fuse address can already be indicated, in one embodiment of the invention, by a marking disposed on the printed circuit board, for example by a number denoting the fuse address. As a result, the assembly of the releasing device is simplified and interchange of various fuse addresses can be avoided.

Furthermore, it is advantageous if the conductor tracks on the printed circuit board have a meander-shaped course. This makes it possible to filter out high-frequency radiations and thereby to avoid their effect on the integrated circuit.

The invention is explained in greater detail by reference to exemplifying embodiments.

DETAILED DESCRIPTION

Figure 1:
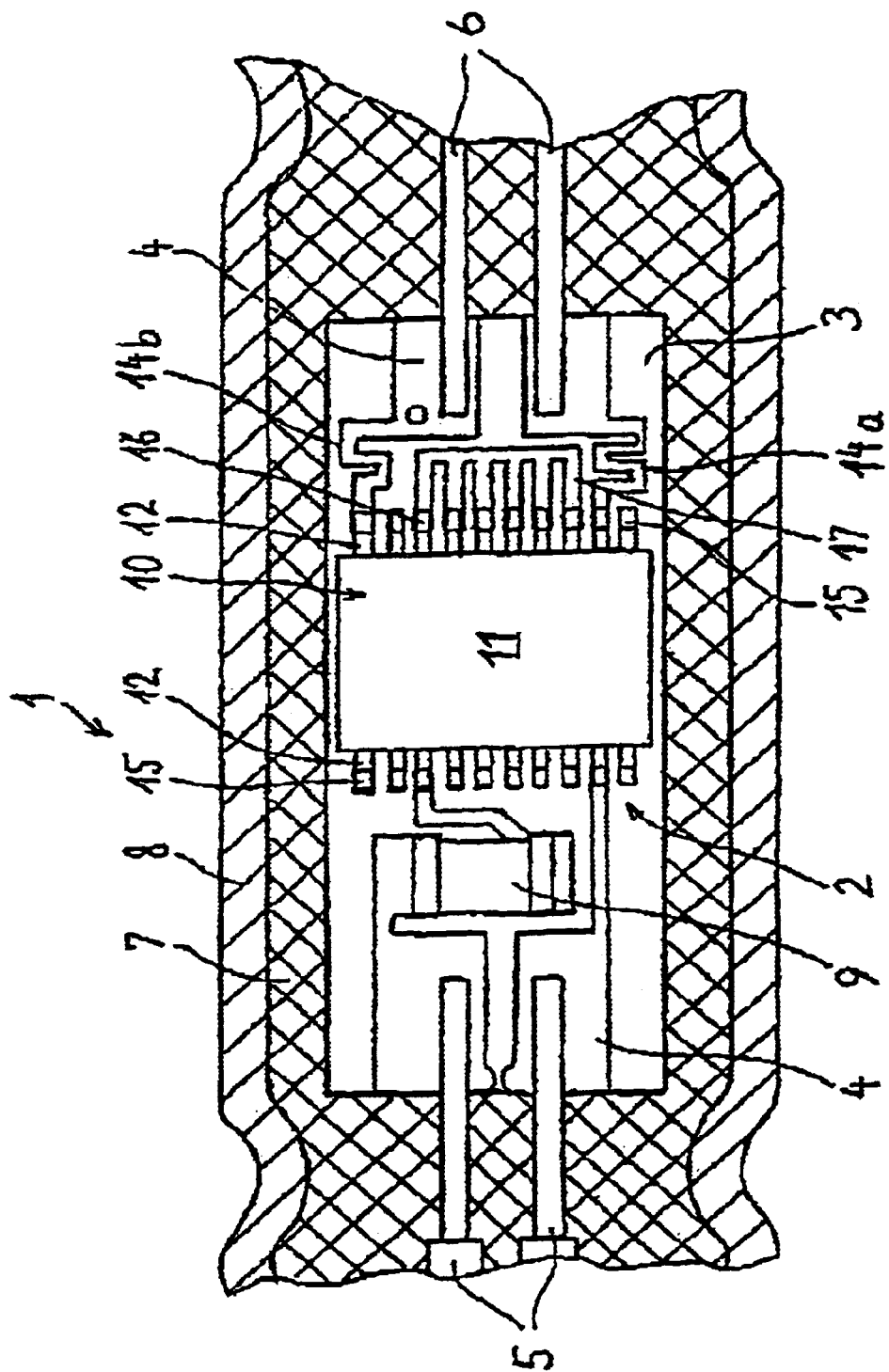
FIG. 1 shows a portion of a releasing unit with the electronic part, the so-called hybrid.

FIG. 1 shows, on an enlarged scale, the part or a releasing unit 1 in which the hybrid 2, the electronic part, is embedded. The electronic components are disposed on a printed circuit board 3. On the latter can be seen printed conductor tracks 4 that connect the electronic components together and to the two connecting wires of the input 5 and to the two connecting wires 6 of a primer cap not shown here. The printed circuit board 3 may be composed of a particularly bending-resistant material or, alternatively, as in the present case, be embedded in a cured, nonmetallic material 7. The material may be, for example, a plastics material or a casting resin. It surrounds the connecting wires 5 and 6 and the hybrid 2. After the hybrid 2 has been pushed in, the material, while fluid, is poured into the sleeve 8 of the releasing device 1 and cured.

In addition to the energy-storage capacitor soldered onto the underside of the printed circuit board 3 and therefore not visible here, the printed circuit board 3 contains a protective and fuse resistor 9 and also an integrated circuit 10. The protective and fuse resistor 9 is soldered on by means of the reflow method, which makes possible particularly clean solder joints. The integrated circuit 10 in enclosed in an IC housing 11 and is therefore protected against external effects, in particular against vibrations, such as those occurring with use as detonators in adjacent boreholes (interval ignition). In particular, the fuse address allocation, the storage of the arming code and the setting of the delay times are performed with the integrated circuit 10. The housing 11 of the present integrated circuit 10 has a plurality of terminals, in the case shown 12; six on each side that are connected to the conductor tracks 4 and together. The meander-shaped connections 14a and 14b to the feed conductor 6 to the primer cap, not shown here, are intended to protect against the effect of high-frequency interfering signals.

The terminals 12 brought out of the IC housing 11 make it possible to test the integrated circuit 10 prior to its embedding in the sleeve 8 at its connection points 15. The chassis grounds 16 are brought out of the housing 11 with more than one terminal and are connected together by a conductor track 17.

In addition to testing the integrated circuit 10, the latter can also be provided prior to installation via the connection points 15 with all the important items of information that essentially comprise the fuse address allocation, the arming code and the setting of the delay time, the ignition time step.

Figure 2:
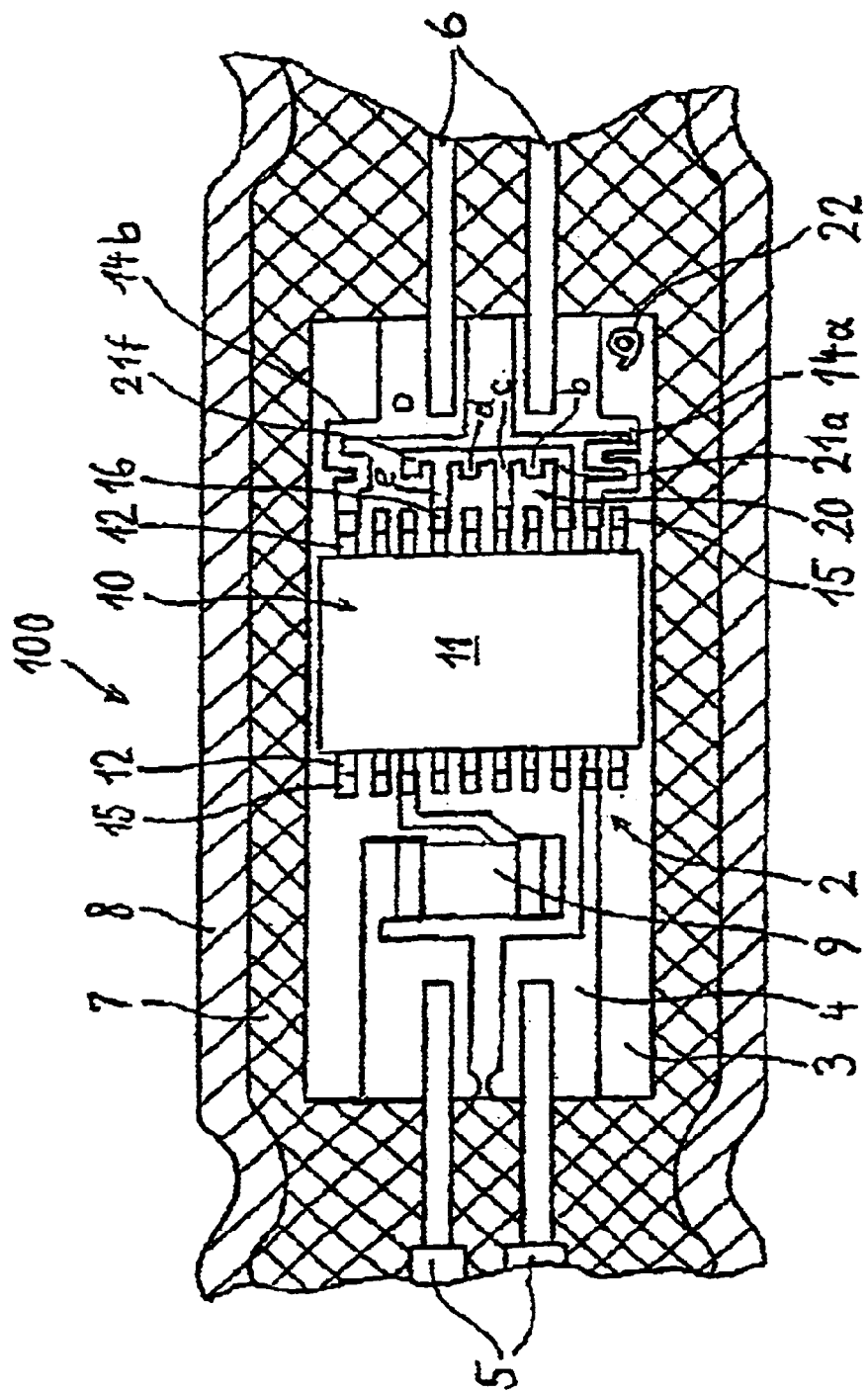
FIG. 2 shows a portion of a releasing unit according to FIG. 1 with a programming field on the printed circuit board for mechanically specifying a delay time of a fuse address.

The releasing unit 100 in FIG. 2 differs from the releasing unit 1 in FIG. 1 in that the delay time is not set individually in it, but in that the integrated circuit 10 is set to a fixed delay time and, consequently, to a fixed fuse address.

In accordance with this exemplary embodiment of the invention, a programming field 20 composed of conductor tracks 21 is formed on the otherwise similarly equipped printed circuit board 3. A predetermined pattern for the connection of the conductor tracks 21 to the chassis grounds 16 specifies the setting of a certain delay time and is characteristic of a certain fuse address. Of the conductor tracks 21a to 21f, the conductor tracks 21a, 21c and 21e are connected to the terminals 12, while the conductor tracks 23b, 21d and 21f are open-circuited. This produces a predetermined bit pattern that determines the delay time. No intervention in the interior of the integrated circuit 10 takes place. This is the same for all the fuse addresses. The open-circuiting of the conductor tracks 21a to 21f may be provided as a printed pattern even during the production of the printed circuit boards 3. The pattern of a programming field that is assigned to a certain fuse address can be marked on the printed circuit board 3 by a marking 22 and, in the present exemplifying embodiment, this is the number "6" for the sixth fuse address. Another pattern of connection of the conductor tracks 21a to 21f to the terminals 12 is assigned in each case to another fuse address.

What is claimed is:

1. An electronic releasing device for pyrotechnic igniters having a primary and a secondary charge, wherein the primary charge is ignited by means of a circuit that comprises electronic components and whose essential electronic components are accommodated as an integrated circuit in an IC housing, with the housing being disposed on a printed circuit board, wherein the terminals of the IC housing are provided as connecting points for test instruments for checking the serviceability of the integrated circuit and the igniter function and also serve for connection to external electronic devices for programming the releasing device.

2. The electronic releasing device of claim 1, wherein the chassis grounds of the integrated circuit are brought out at more than one connection point.

3. The electronic releasing device of claim 1, wherein the ignition time steps and the fuse addresses are stored in a memory in the integrated circuit.

4. The electronic releasing device of claim 1, wherein the fuse addresses are dispose din a programming field on the printed circuit board in the form of a predetermined pattern of connections of the conductor tracks to the terminals of the integrated circuit.

5. The electronic releasing device of claim 4, wherein the fuse addresses are indicated in each case by means of a marking on the printed circuit board.

6. The electronic releasing device of claim 1, wherein the meander-shaped conductor track course on the printed circuit board represents a filter for combating high frequencies and, consequently, a protection for the electronic components.

7. The electronic releasing device of claim 1, wherein at least one protective and fuse resistor is soldered on by means of the reflow method.

* * * * *